US007976227B2

(12) United States Patent
Orf et al.

(10) Patent No.: US 7,976,227 B2
(45) Date of Patent: Jul. 12, 2011

(54) STABILIZED EQUIPMENT SUPPORT AND METHOD OF BALANCING SAME

(75) Inventors: Hans Robert Orf, Simi Valley, CA (US); Frank A Rush, Birmingham, AL (US)

(73) Assignee: The Tiffen Company LLC, Hauppauge, NY (US)

( * ) Notice: Subject to any disclaimer, the term of this patent is extended or adjusted under 35 U.S.C. 154(b) by 0 days.

(21) Appl. No.: 12/490,584

(22) Filed: Jun. 24, 2009

(65) Prior Publication Data

US 2010/0172642 A1    Jul. 8, 2010

Related U.S. Application Data

(60) Provisional application No. 61/142,503, filed on Jan. 5, 2009.

(51) Int. Cl.
　*G03B 17/00*　　(2006.01)
　*H04N 5/225*　　(2006.01)
(52) U.S. Cl. .................. 396/421; 352/243; 348/376
(58) Field of Classification Search .................. 396/421; 352/243; 348/376
See application file for complete search history.

(56) References Cited

U.S. PATENT DOCUMENTS

| | | | | |
|---|---|---|---|---|
| 4,341,452 A * | 7/1982 | Korling | | 396/428 |
| 4,545,660 A | 10/1985 | Rudolf | | |
| 4,570,887 A | 2/1986 | Banister | | |
| 5,081,478 A * | 1/1992 | Hayashida et al. | | 396/425 |
| 5,098,182 A | 3/1992 | Brown | | |
| 5,229,798 A * | 7/1993 | Brown | | 352/243 |
| 5,243,370 A * | 9/1993 | Slater | | 352/243 |
| 5,579,071 A | 11/1996 | Wetzel et al. | | |
| 5,622,012 A | 4/1997 | Schijf | | |
| 6,330,752 B1 * | 12/2001 | Ellam | | 33/471 |
| 6,663,298 B2 | 12/2003 | Haney | | |
| 7,563,038 B2 * | 7/2009 | Hershenzon | | 396/419 |
| 2004/0233389 A1 * | 11/2004 | Bruggaier | | 352/243 |
| 2006/0262274 A1 | 11/2006 | Brown et al. | | |

\* cited by examiner

*Primary Examiner* — Rodney E Fuller
(74) *Attorney, Agent, or Firm* — Kirschstein, etal.

(57) ABSTRACT

A stabilized support for supporting motion-sensitive, ultra-lightweight, camera equipment includes a hollow platform on which the camera equipment is mounted, and a structure on which the platform is detachably mounted. The structure has a handle, a counterweight mounted below the platform, and an arm for connecting the handle with the counterweight. The platform has a plurality of interior compartments preferably arranged in generally parallel rows at opposite sides of the platform, each row extending past a center of gravity. A plurality of ballast weights is held and confined in the interior compartments within the platform to balance the support when held by the handle, or supported by optional support legs. The placement of the ballast weights is based on a balancing procedure in which the camera equipment is balanced relative to a stationary horizontal support surface.

18 Claims, 17 Drawing Sheets

STABILIZED EQUIPMENT SUPPORT AND METHOD OF BALANCING SAME

This application claims the priority of U.S. provisional patent application Ser. No. 61/142,503, filed Jan. 5, 2009.

BACKGROUND OF THE INVENTION

This invention generally relates to a stabilized equipment support and a method of balancing the same and, more particularly, to supporting ultra-lightweight cameras or other motion-sensitive equipment to isolate such equipment from unwanted motion during use.

Still picture and motion picture (video) cameras have, at some time during their use, been held by a human operator whose inherent instability tended to produce blurred still and moving images. The center of gravity laid within the camera and, by holding the camera at its exterior surface, the operator's inevitable unsteady hand motions exerted forces in directions effectively tangential to the camera's center of gravity, thereby resulting in undesirable motions of the camera along the pan and/or tilt and/or roll axes.

One approach to solving such motion problems was to mount the camera on pods, e.g., monopods or tripods. Another approach was to mount the camera on shoulder mounts and body braces to secure the camera to the operator's body. However, neither of these approaches were altogether satisfactory when the camera operator was ambulatory.

As exemplified by U.S. Pat. No. 5,098,182; U.S. Pat. No. 5,229,798; and U.S. Pat. No. 5,579,071, a more effective approach employed an equipoising camera support that statically and/or dynamically isolated the camera from both angular and spatial motions, thereby producing stable images even when the camera operator was ambulatory. Such equipoising supports have become standard tools in the still and video camera industries.

However, as satisfactory as such equipoising supports have been, they were primarily designed to support relatively large and heavy still and video cameras, weighing on the order of 10 pounds and much more. It was discovered that as the weight of the camera increased, the stability of the resulting image also tended to increase. Hence, it was believed that the lighter the camera, the less useful such an equipoising support would be.

Nevertheless, camera technology evolved towards miniaturization and lighter cameras. A full-sized consumer video device weighing about 5.5 pounds (i.e., the original "CamCorder") contained a camera and a recorder and was designed to rest on the shoulder of the operator, and was followed over the years by more compact and ever lighter devices weighing on the order of 2.6 pounds and, hence, were entirely hand-supported. In recent years, ultra-lightweight cameras (less than two pounds), such as web cameras, weighing less than one pound have been developed, and the current ultra-lightweight cameras are so compact and light that they have even been incorporated into other devices, such as cellular phones weighing on the order of five ounces. In addition to the traditional unsteadiness of a handheld camera, these handheld devices were being operated by amateur photographers, still further resulting in unstable and often unacceptable still and video images, especially during ambulatory operation.

Efforts have been made to respond to the motion problem aggravated by ever lighter and lighter cameras, by providing miniature versions of many of the traditional camera supports, e.g., shoulder mounts, body braces and pods, that have been used in connection with the heavier commercial camera equipment used by professionals. Despite the bias against its use for light cameras, a miniaturized equipoising support having a bottom counterweight mounted below an overhead camera has also been tried. However, in practice, the counterweight was often too light, or too close to the overhead camera, and the resulting support was imbalanced. To correct such weight imbalances, the art proposed, e.g., in U.S. Pat. No. 5,098,182, to mount small weights either on the lower counterweight, or on the camera itself. However, attaching such small weights to the counterweight made the equipoising support bottom heavy, and attaching such small weights to each camera was a cumbersome, laborious balancing procedure, typically performed while holding the support in one's unsteady and fatigued hand. In any event, there was always the possibility that the attached weights could shift in position, or even become detached, when the camera operator was ambulatory.

Thus, these various approaches have failed to effectively and satisfactorily eliminate the problems of instability encountered in connection with operation of the ever-lighter, digital, still and motion, cameras that have been developed, and it therefore is desirable to furnish a stabilized equipment support particularly well suited to the special requirements of ultra-lightweight, handheld, digital cameras, particularly consumer-operated video cameras and like devices, e.g., those incorporated into cellular telephones. It is also desirable to improve the balancing procedure to avoid the instability and unsteadiness of one's hand that prevents an accurate balance from being obtained, and to avoid the shifting and detachment of separate weights arranged on the support.

SUMMARY OF THE INVENTION

One aspect of this invention is directed to a stabilized support for supporting motion-sensitive equipment, especially an ultra-lightweight camera, and for isolating the equipment from unwanted motion. The stabilized support includes a platform on which the equipment is mounted, and a structure on which the platform is detachably mounted. The structure includes a handle to be gripped and held by a human operator, a counterweight mounted below the platform, and an arcuate arm for connecting the handle with the counterweight. A plurality of ballast weights is supported by the platform to balance the support about its center of gravity. The ballast weights add weight to an upper portion of the support, and thus compensate for the very low weight of the equipment.

Preferably, the platform has an interior, and the ballast weights are mounted in the interior of the platform. The platform advantageously has a plurality of interior compartments, preferably arranged in generally parallel rows at opposite sides of the platform, each row extending in opposite directions fore and aft of the center of gravity. Each ballast weight is held and confined in a selected individual compartment. The interior confinement of the ballast weights prevents them from shifting and detachment, especially when the camera is moved, especially when turned upside down during operation, and/or when the operator is ambulatory. In addition, by placing the ballast weights fore and aft of the center of gravity, a measure of rotational stability is added.

It is further advantageous if a mounting plate is fixed to the equipment. The equipment and the plate are jointly removably and adjustably mounted on the platform. This enables the equipment to be readily mounted on, and detached from, the platform. In a preferred embodiment, the mounting plate has a trapezoidal cross-section, and the platform has a trapezoidal channel of complementary contour to the plate for slidably receiving the plate in a dovetail joint. In the event that the equipment has a control, such as a slide switch for releasing a battery for powering the equipment, and if the fixed mounting plate covers that control in certain versions of the equipment, then another aspect of this invention proposes configuring the mounting plate with a pair of hinged plate portions movable relative to each other. Thus, one of the plate portions can be pivoted away from blocking the control to enable ready access to the control without removing the plate from the equipment when, for example, the battery needs replacement.

The placement of the ballast weights in selected ones of the interior compartments is determined by a balancing procedure, as described below. To aid the balancing procedure, the platform is configured with a coupler aligned with the center of gravity along a vertical coupler axis for receiving a stationary balance tool when the platform is detached from the structure. An adjustable element is provided on the platform for balancing the platform relative to the stationary balance tool in a balanced position. A squaring tool is fixed to the equipment mounted on the platform during the balancing procedure and has indicia thereon. This indicia, together with additional information, e.g., the weight of the equipment, is used to determine how many ballast weights are to be placed within the platform.

A pair of foldable legs is optionally mounted on the arm for supporting the stabilized support on a support surface when the stabilized support is to be used as a tripod, or not in ambulatory use. Thus, the stabilized support may be supported by the handle or by the legs. The handle preferably has a virtually friction-free, three-axis, ball bearing gimbal that is indexably lockable and threaded into the coupler. The handle can engage a mounting notch for convenient fold-up storage during transport or equipment storage.

Still another aspect of this invention is directed to the method of balancing the motion-sensitive camera equipment. The method is performed by initially mounting the camera equipment in one orientation on the squaring tool having indicia. This squaring tool resembles a carpenter's square and has a horizontal plate meeting a vertical plate at a right angle. For example, the camera equipment is turned 90 degrees from its normal, upright, intended position of use and is mounted with its side surface contacting the horizontal plate of the squaring tool, with its bottom surface contacting the vertical plate of the squaring tool, and with its viewfinder folded flat against the side surface. Then, the squaring tool and the camera equipment in said one orientation is mounted for free pivoting movement, in a seesaw-like manner, about the coupler axis on the stationary balance tool mounted on a stationary horizontal support surface. The stationary balance tool has a fulcrum situated along the coupler axis. Then, when the squaring tool with the camera equipment in said one orientation are horizontally balanced on the stationary balance tool, indicia on the squaring tool is read. This indicia, together with additional information, e.g., the weight of the equipment, is then used to determine how many ballast weights are to be placed within the above-described platform, as well as the placement of the ballast weights. A chart, slide ruler, software program, online calculator, or the like is provided for correlating the indicia and the equipment weight to the number and placement of the ballast weights.

The method is further performed by removing the squaring tool from the camera equipment, and mounting the camera equipment in another orientation on the ballasted platform, that is, with the ballast weights already positioned within the platform. For example, the camera equipment is mounted upright in its normal position of use, with its viewfinder deployed, i.e., extending horizontally away from a side surface of the upright camera equipment, and with its bottom surface contacting the platform via the mounting plate. Then, the ballasted platform with the camera equipment in said other orientation is mounted for free pivoting movement, in a seesaw-like manner, about the coupler axis on the stationary balance tool, again mounted on the stationary horizontal support surface, and again with its fulcrum along the coupler axis. Then, the ballasted platform with the camera equipment in said other orientation is adjusted until they assume a horizontally balanced position. Thus, the camera equipment in its normal position of use on the ballasted platform is horizontally balanced, i.e., from side-to-side.

The method is still further performed by mounting the ballasted platform with the camera equipment in said other orientation on the above-described support structure having the counterweight mounted below the ballasted platform, by mounting the support structure and the ballasted platform with the camera equipment in said other orientation for free pivoting movement, in a seesaw-like manner, about the coupler axis on the stationary balance tool, and by adjusting the equipment and the mounting plate relative to the platform in a coarse adjustment, and by adjusting the counterweight in a fine adjustment, until the support structure and the ballasted platform with the camera equipment in said other orientation is horizontally balanced on the stationary balance tool, again mounted on the stationary horizontal support surface, and again with its fulcrum along the coupler axis.

Thus, the balancing procedure is no longer performed while holding the support or its component parts in one's unsteady hand, but instead, is performed while balancing the support and/or its component parts relative to a stationary horizontal support surface. The operator's hand is no longer fatigued during the balancing procedure. This avoids the prior art's problems of instability, fatigue and unsteadiness of one's hand that prevents an accurate balance from being obtained.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
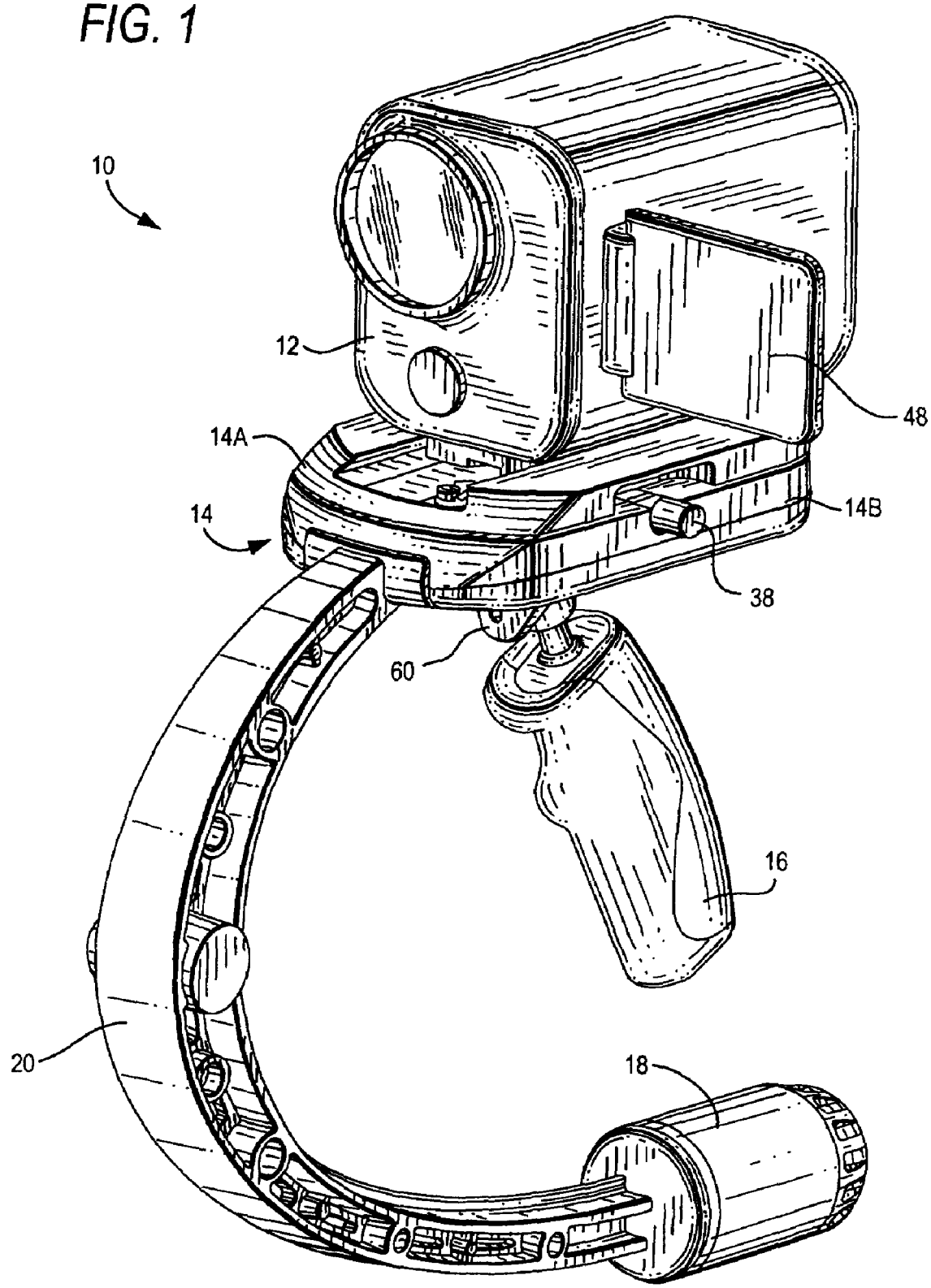
FIG. 1 is a front perspective view of a stabilized camera equipment support in accordance with this invention.
Figure 2:
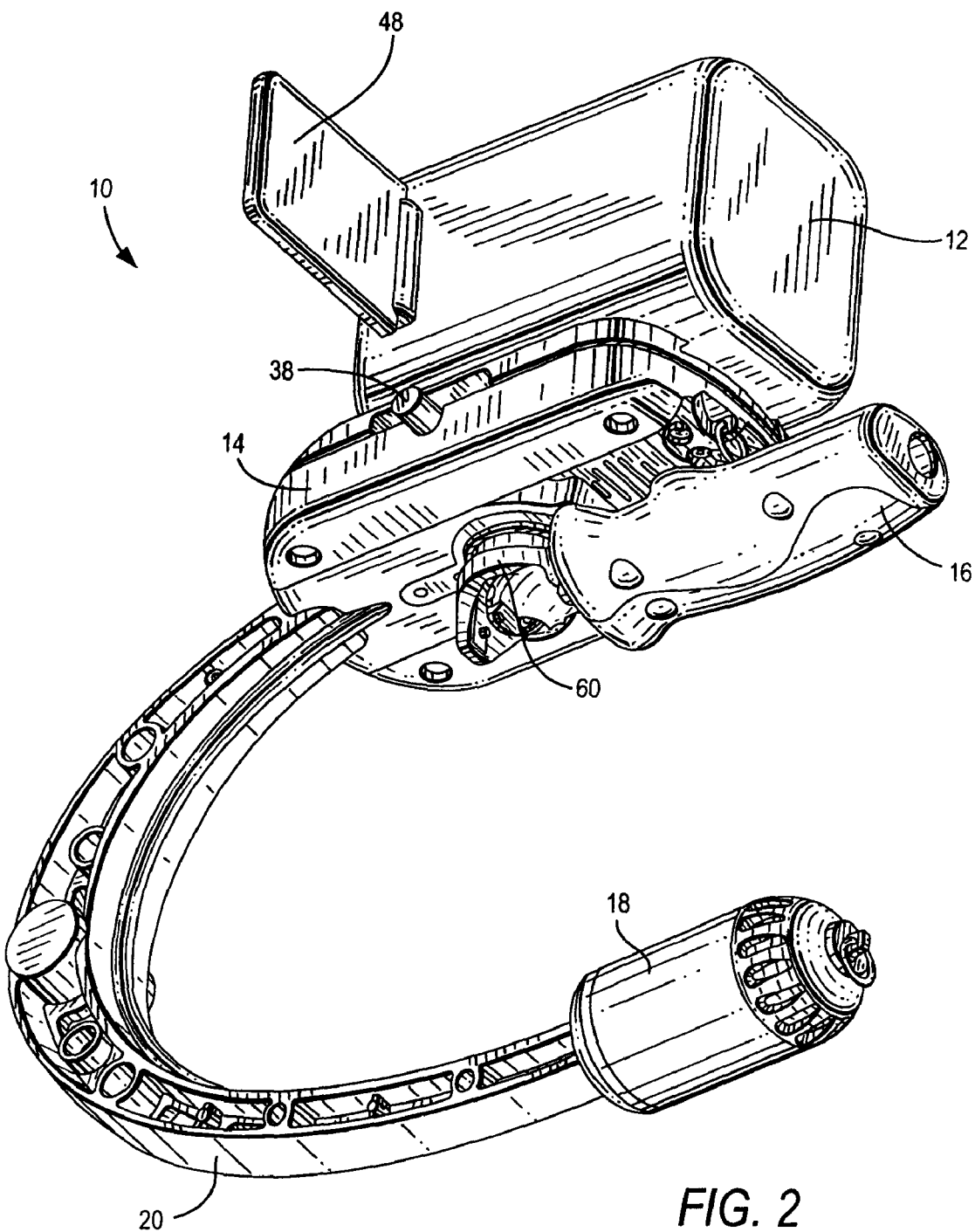
FIG. 2 is a bottom perspective view of the stabilized support of FIG. 1, with a handle folded back and locked in an equipment storage position.
Figure 3:
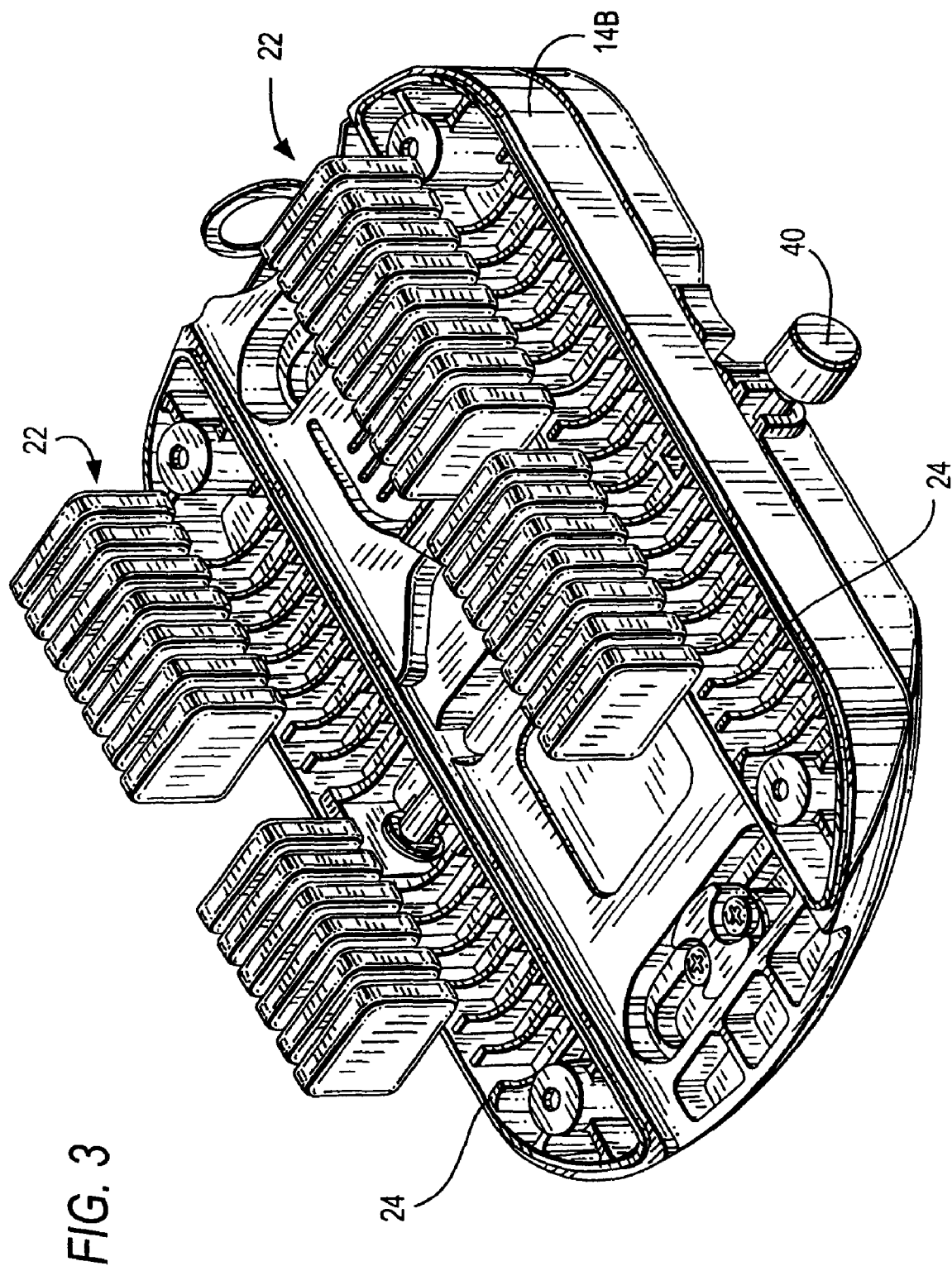
FIG. 3 is an exploded, inverted, perspective view of a platform of the stabilized support of FIG. 1, together with a plurality of ballast weights for mounting in the platform.

Referring now to the drawings, reference numeral 10 generally identifies a stabilized support for supporting motion-sensitive equipment 12, especially an ultra-lightweight still or video, digital camera, and for isolating the equipment 12 from unwanted motion. As shown in FIGS. 1-2, the stabilized support 10 includes a hollow platform 14 on which the equipment 12 is mounted, and a structure on which the platform 14 is detachably mounted. The structure includes a handle 16 for holding by a human operator, an adjustable counterweight 18 mounted below the platform 14, and an arcuate arm 20 having discrete weights therealong for connecting the handle 16 with the counterweight 18. A plurality of ballast weights 22, as best seen in FIG. 3, is supported by the platform 14 to balance the support 10 about a center of gravity. The ballast weights 22 not only add weight to an upper portion of the support 10, but also add rotational stability, and thus compensate for the very low weight of the equipment 12 and make the equipment 12 less susceptible to unwanted motion.

Figure 3A:
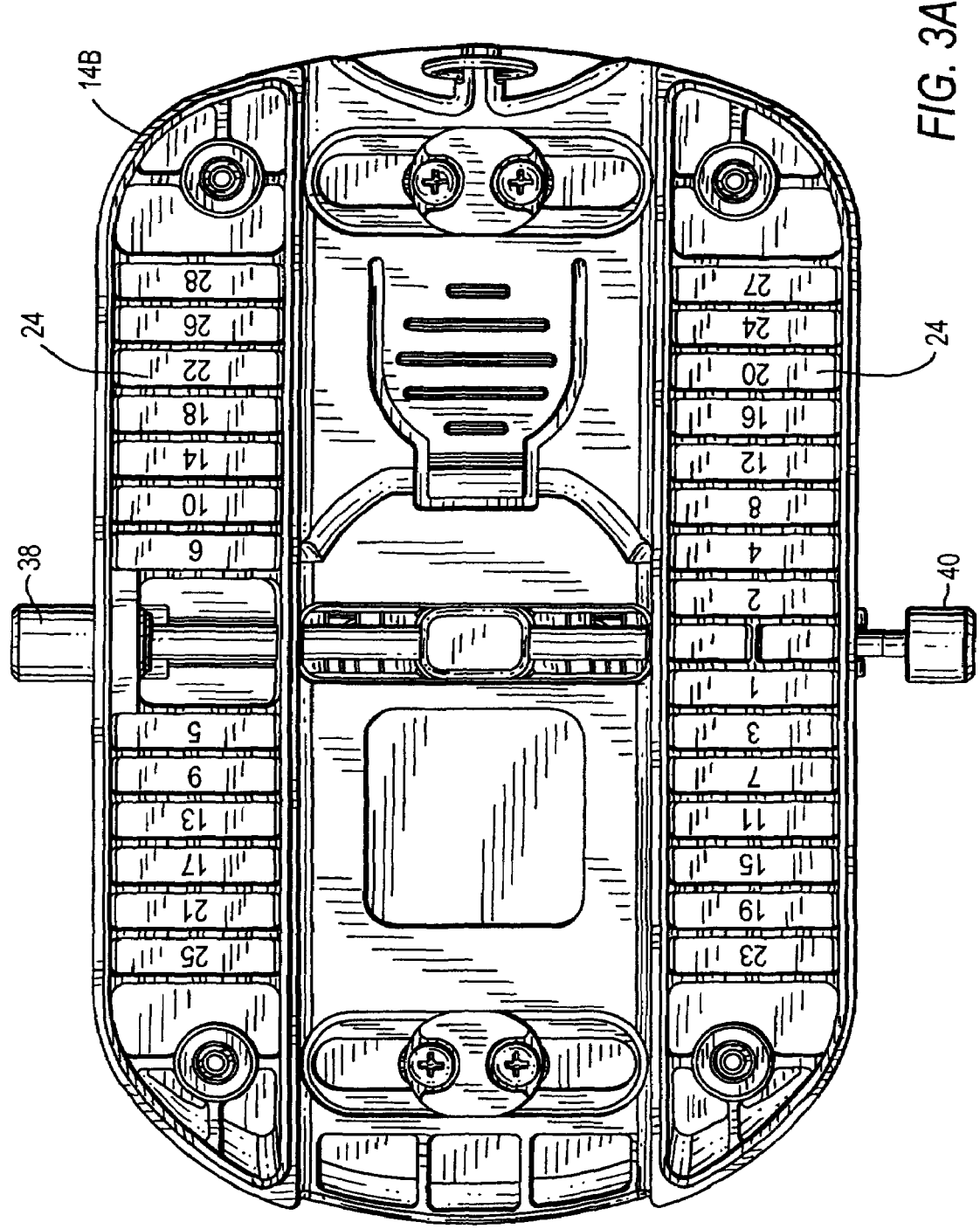
FIG. 3A is an enlarged, bottom plan view of the platform of FIG. 3, together with numbered compartments for receiving the ballast weights.
Figure 4:
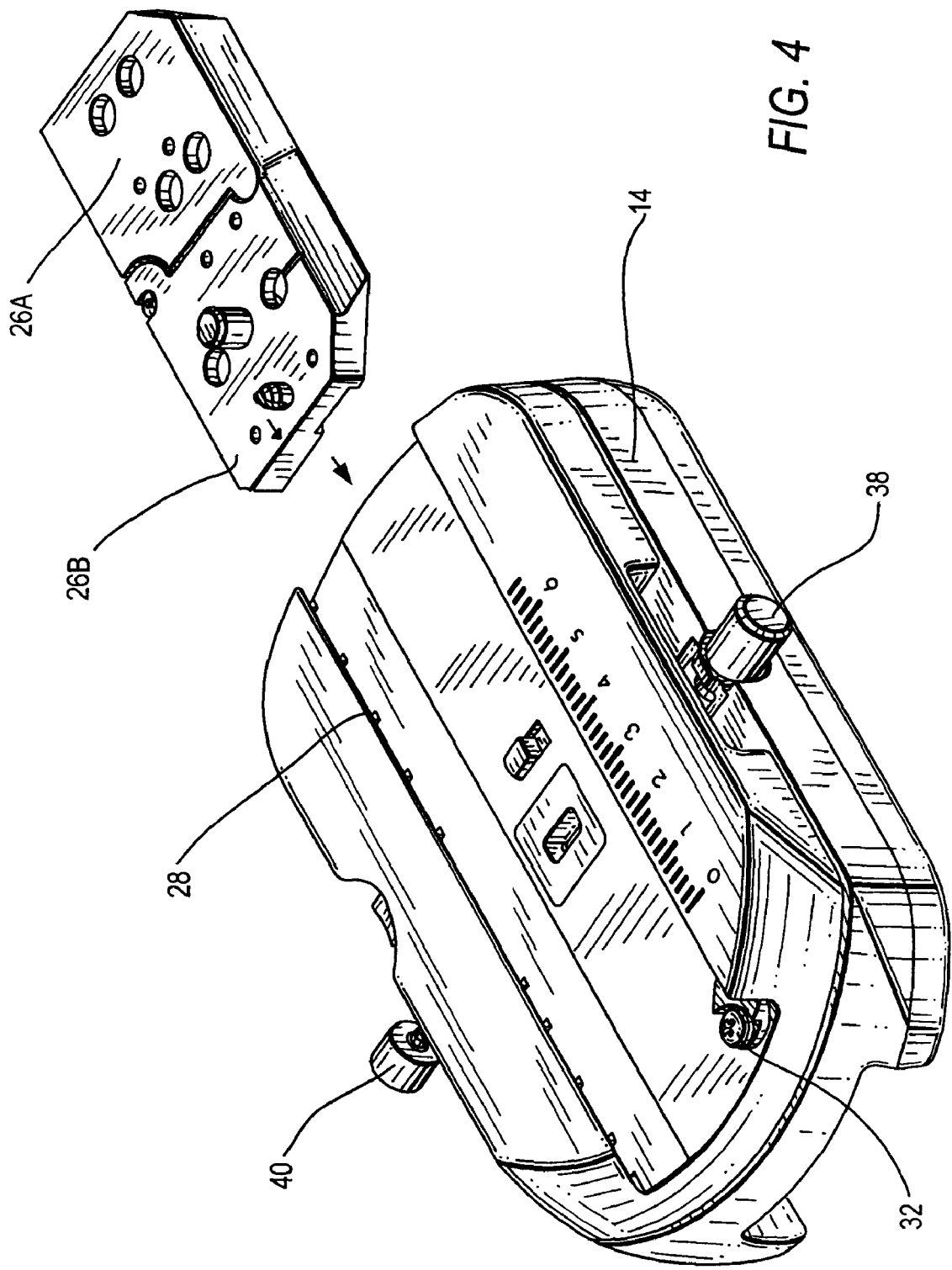
FIG. 4 is an exploded perspective view of a hinged mounting plate for connection to the platform of the stabilized support of FIG. 1.
Figure 5:
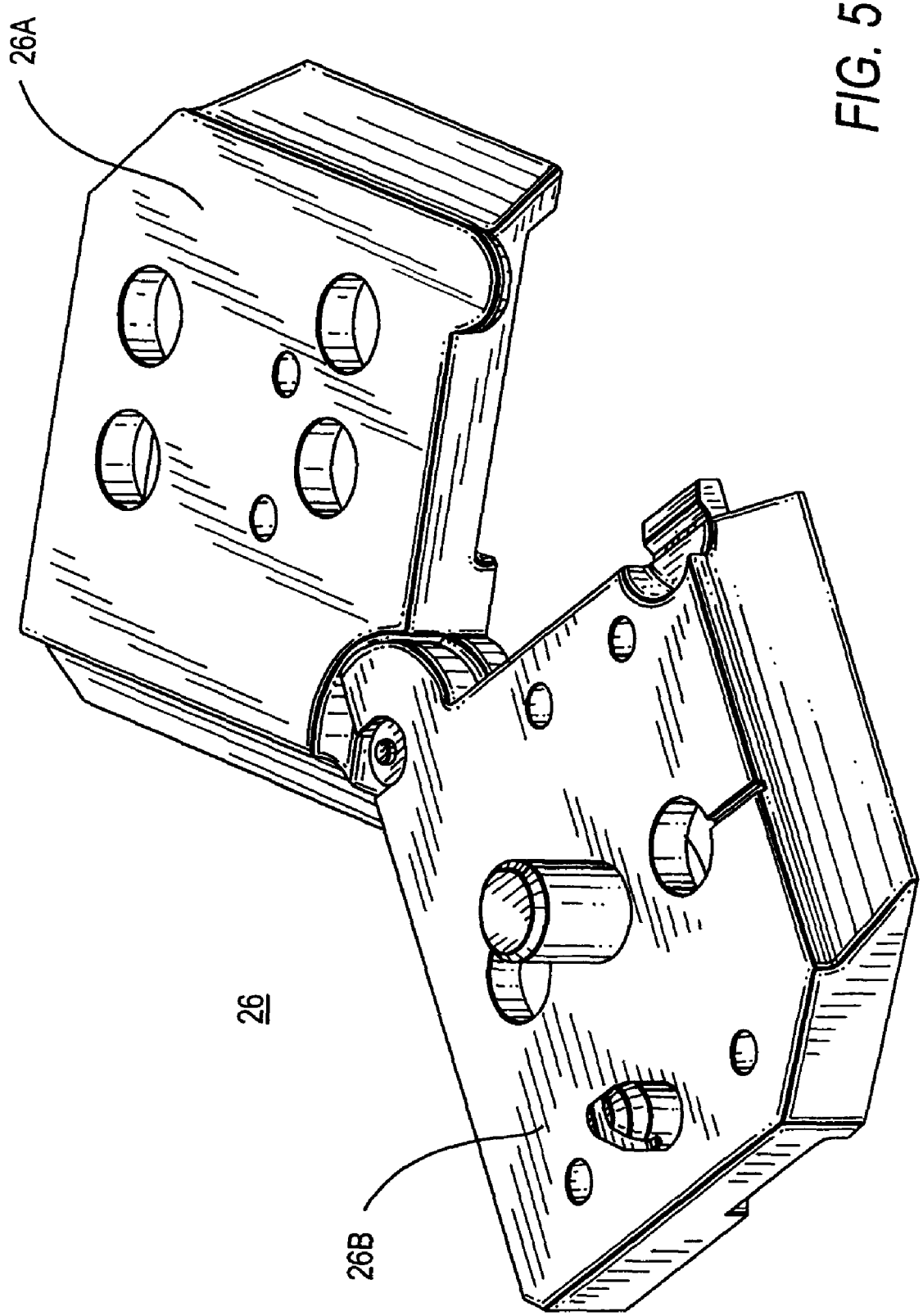
FIG. 5 is an enlarged perspective view of the hinged mounting plate of FIG. 4.

Preferably, the platform 14 has upper and lower housing portions 14A, 14B bounding an interior and movable from side-to-side (right-to-left) in a generally horizontal plane relative to each other. The ballast weights 22 are mounted in the interior of the platform 14, preferably in the lower portion 14B (see FIG. 3). The platform 14 advantageously has a plurality of interior compartments 24, preferably numbered and arranged, as shown in FIGS. 3 and 3A, in generally parallel rows at opposite sides of the platform 14, each row extending in opposite directions past the center of gravity. Each ballast weight 22 is held and confined in a selected individual compartment 24 of the lower housing portion 14B. The interior confinement of the ballast weights 22 prevents them from shifting and detachment, especially when the camera 12 is moved, especially when turned upside down during operation, and/or when the operator is ambulatory.

As shown in FIGS. 4-7, a sled or mounting plate 26 is fixed to the equipment 12, and the mounting plate 26 and the equipment 12 are jointly adjustably and detachably mounted on the platform 14. This enables the equipment 12 to be readily mounted on, and removed from, the platform 14. In a preferred embodiment, the mounting plate 26 has a trapezoidal cross-section, and the platform 14 has an elongated channel 28 of complementary trapezoidal contour to the plate 26 for slidably receiving the plate 26 in a dovetail joint. The mounting plate 26 and the equipment 12 are thus jointly slidable in a generally horizontal plane fore-and-aft relative to the center of gravity on the platform 14. An adjustable stop 32 abuts against the plate 26 to insure that the plate will always be returned to the same position on the platform 14. A clamp or locking element 40 is provided on the platform 14 for locking the plate 26 in an adjusted fore-and-aft position on the platform 14.

Figure 6:
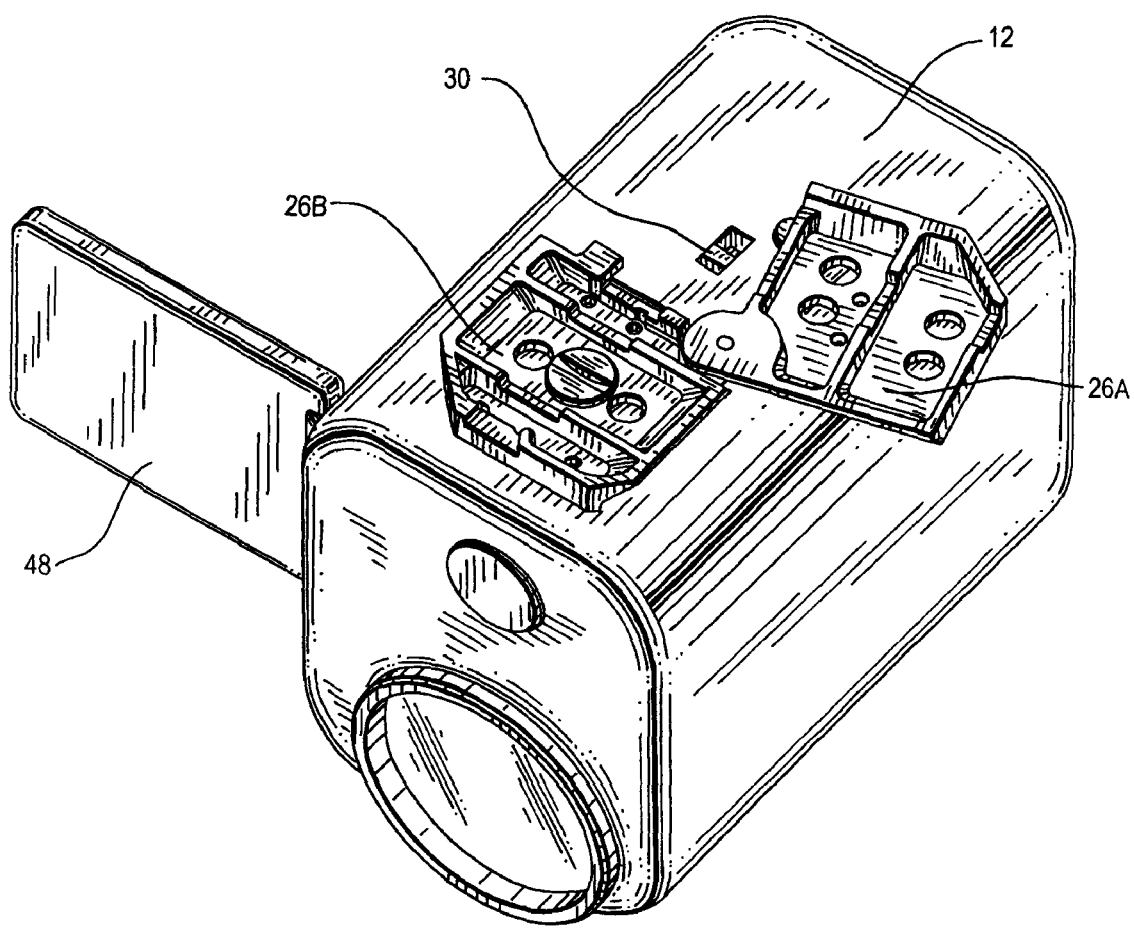
FIG. 6 is a bottom perspective view of the hinged mounting plate of FIG. 5 mounted on the camera equipment in an open position to enable access to a control on the equipment.
Figure 7:
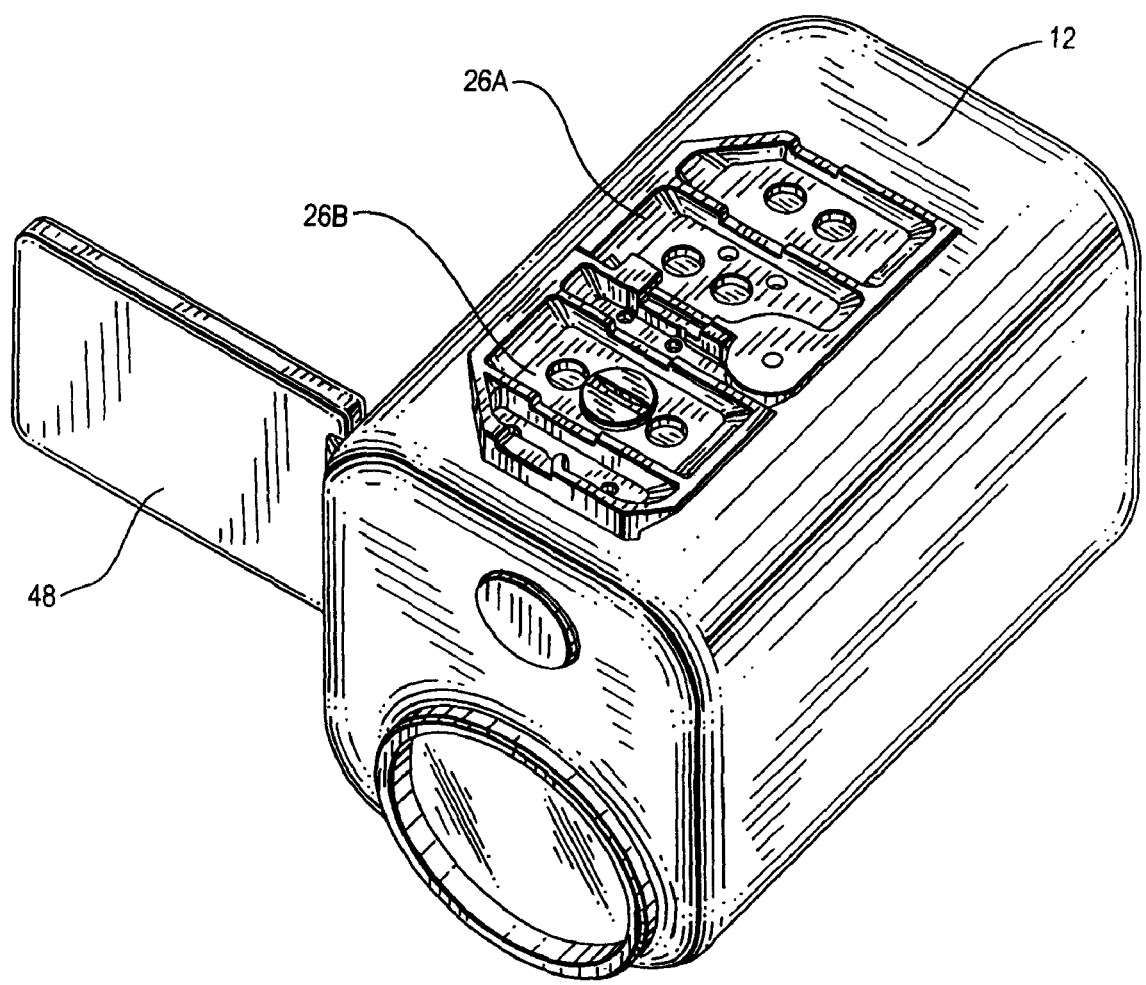
FIG. 7 is a view analogous to FIG. 6, but with the hinged mounting plate in a closed position.

In the event that the equipment 12 has a control 30, such as a slide switch, as shown in FIG. 6, on the base of the equipment 12 and operative for releasing a battery for powering the equipment 12, and if the fixed mounting plate 26 covers that control 30, as shown in FIG. 7, in certain versions of the equipment 12, then another aspect of this invention proposes configuring the mounting plate 26 with a pair of hinged plate portions 26A, 26B movable relative to each other. Thus, one of the plate portions 26A can be pivoted away from blocking the control 30 to enable ready access to the control 30 without removing the plate 26 from the equipment 12 when, for example, the battery needs replacement.

The placement of the ballast weights 22 in selected ones of the interior compartments 24 is determined by a balancing procedure, as described below. To aid the balancing procedure, the platform 14 is, in one embodiment, configured with a center channel 34 aligned with the center of gravity (see FIG. 10) for receiving one embodiment of a stationary balance tool 36 when the platform 14 is detached from the structure. An adjustable element 38 is provided on the platform 14 for balancing the platform 14 relative to the stationary balance tool 36 in a balanced position. Preferably, turning the adjustable element 38 in opposite circumferential directions causes the upper portion 14A of the platform 14 (together with the equipment 12) to shift laterally relative to the lower portion 14B. One embodiment of a squaring tool 42 is fixed to the equipment 12 mounted on the platform 14 during the balancing procedure and has indicia 44 (see FIG. 9) thereon. This indicia 44, together with additional information, e.g., the weight of the equipment, is used, as described below, to determine how many ballast weights 22 are to be placed within the platform 14, as well as the placement of the ballast weights 22. The ballast weights 22 are positionable either fore or aft (Y-axis), and/or to either lateral side (X-axis), of the center of gravity.

Figure 13:
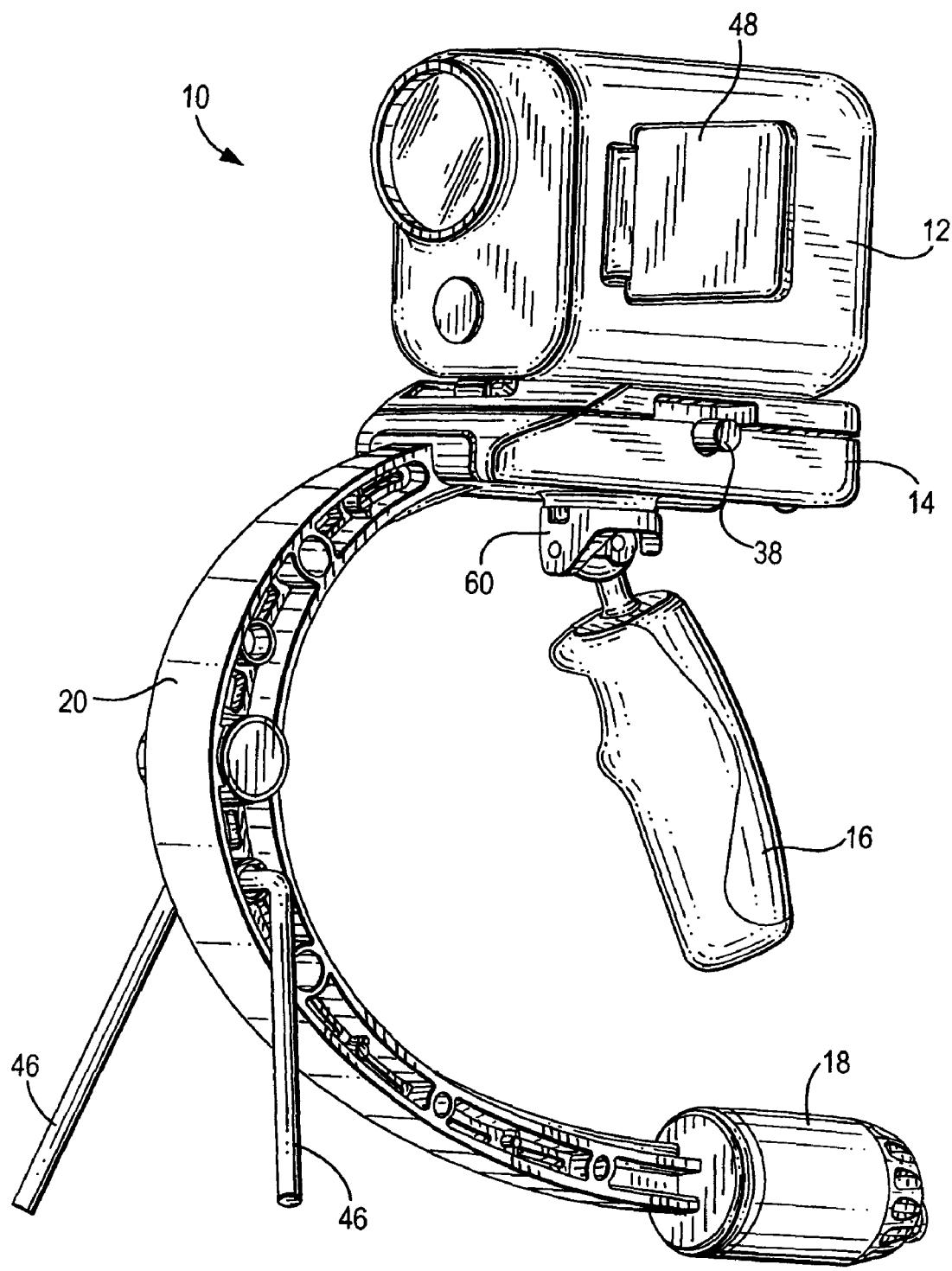
FIG. 13 is a perspective view of the stabilized support of FIG. 1, supported as a tripod by a pair of support legs.
Figure 14:
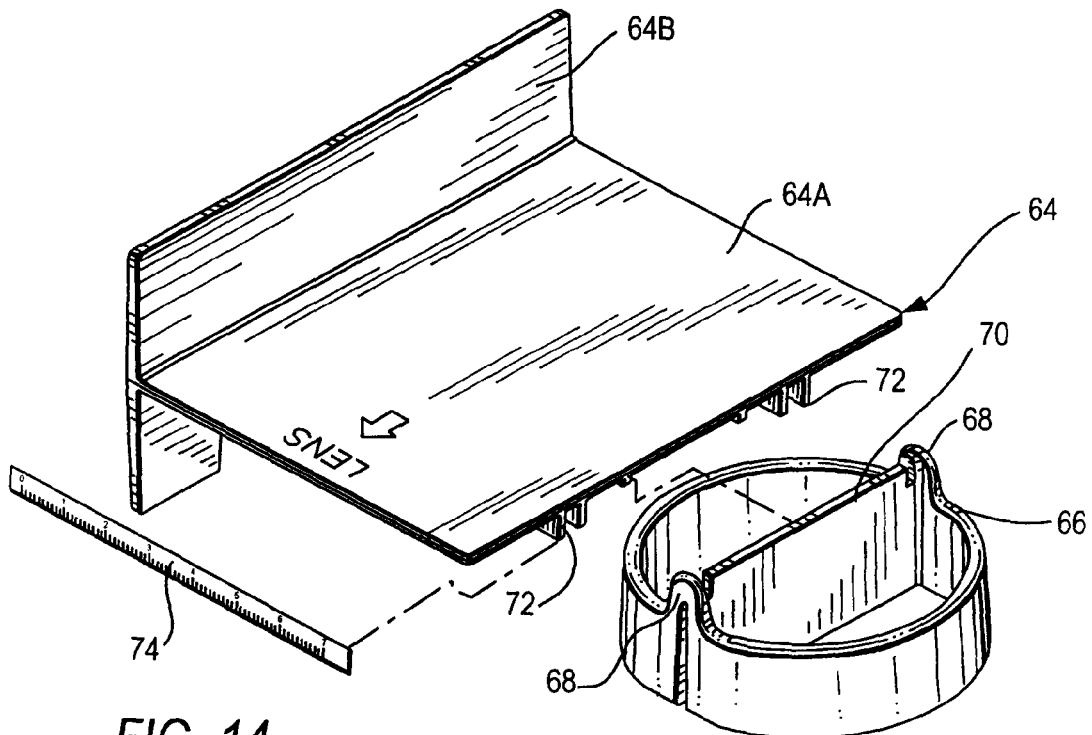
FIG. 14 is an exploded view of another embodiment of a squaring tool for use with another embodiment of a balance tool.
Figure 15:
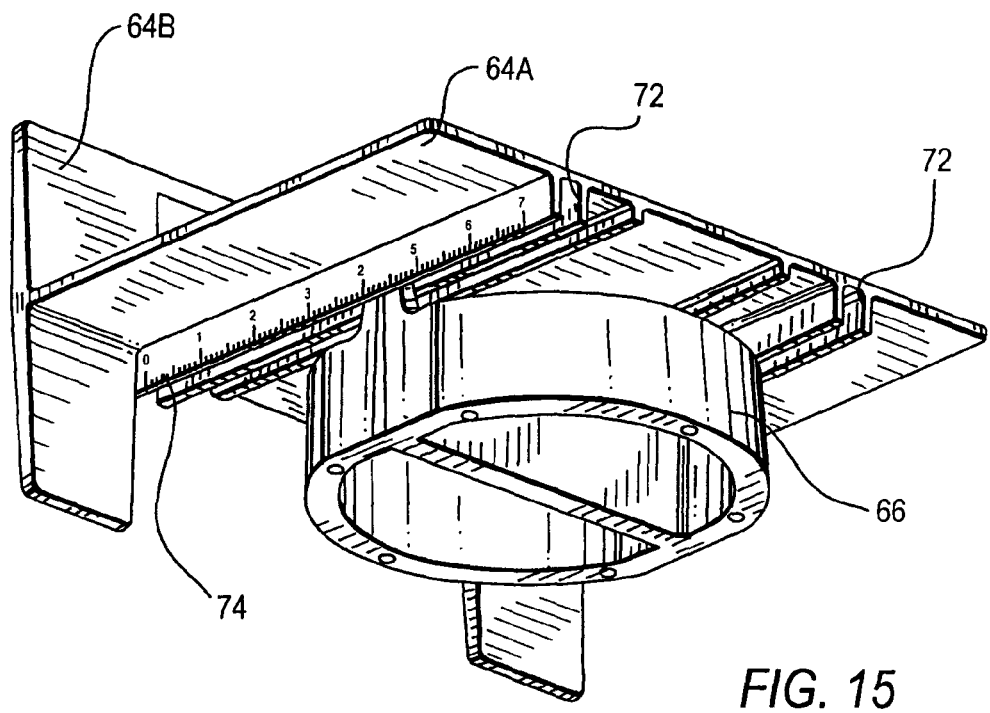
FIG. 15 is a perspective view from below of the squaring tool of FIG. 14 in use with the balance tool of FIG. 14.
Figure 16:
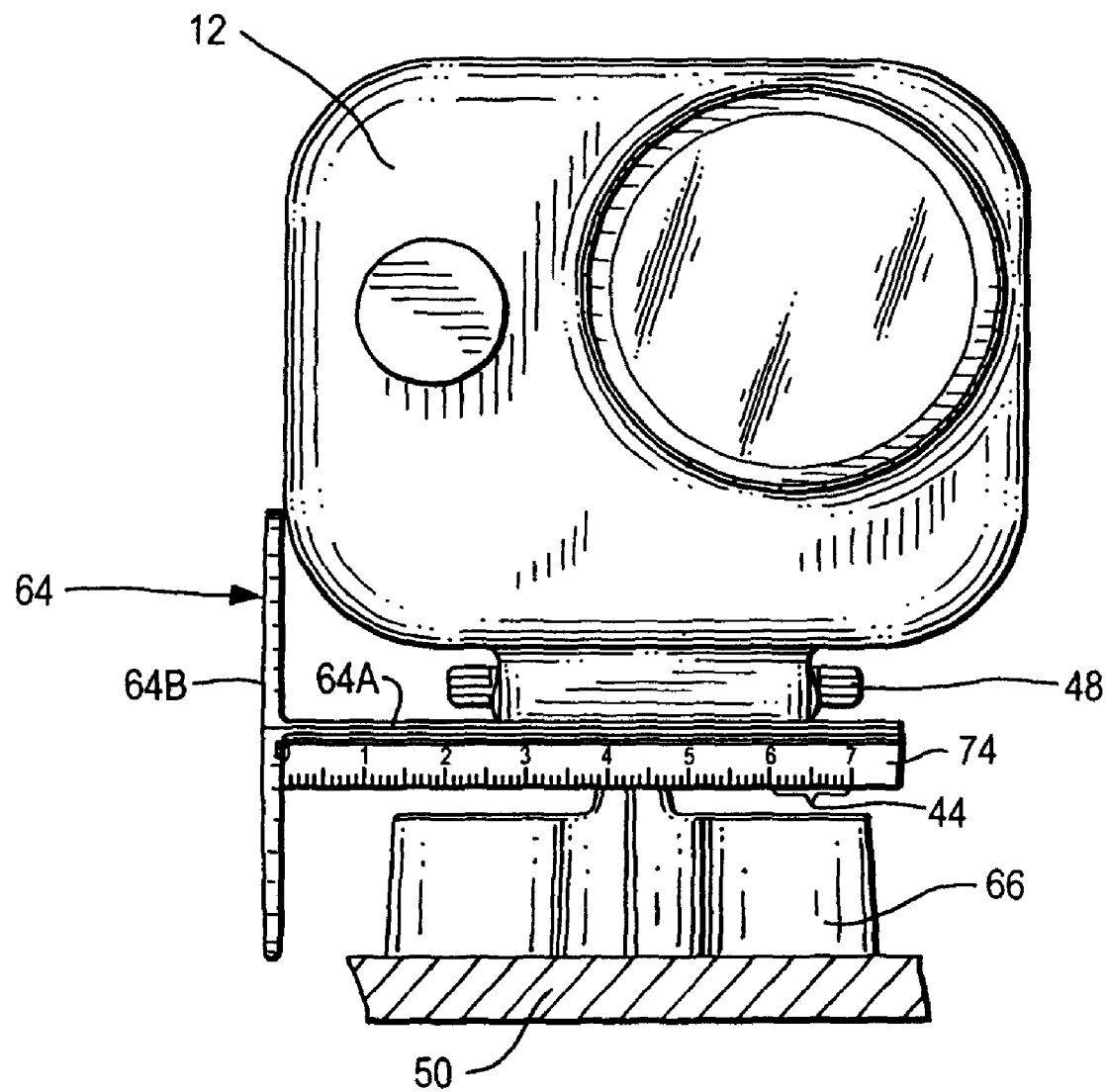
FIG. 16 is a front elevational view of the tools of FIG. 15 in use during an initial balancing step, analogous to that shown in FIG. 9, of a balancing procedure in accordance with this invention.
Figure 17:
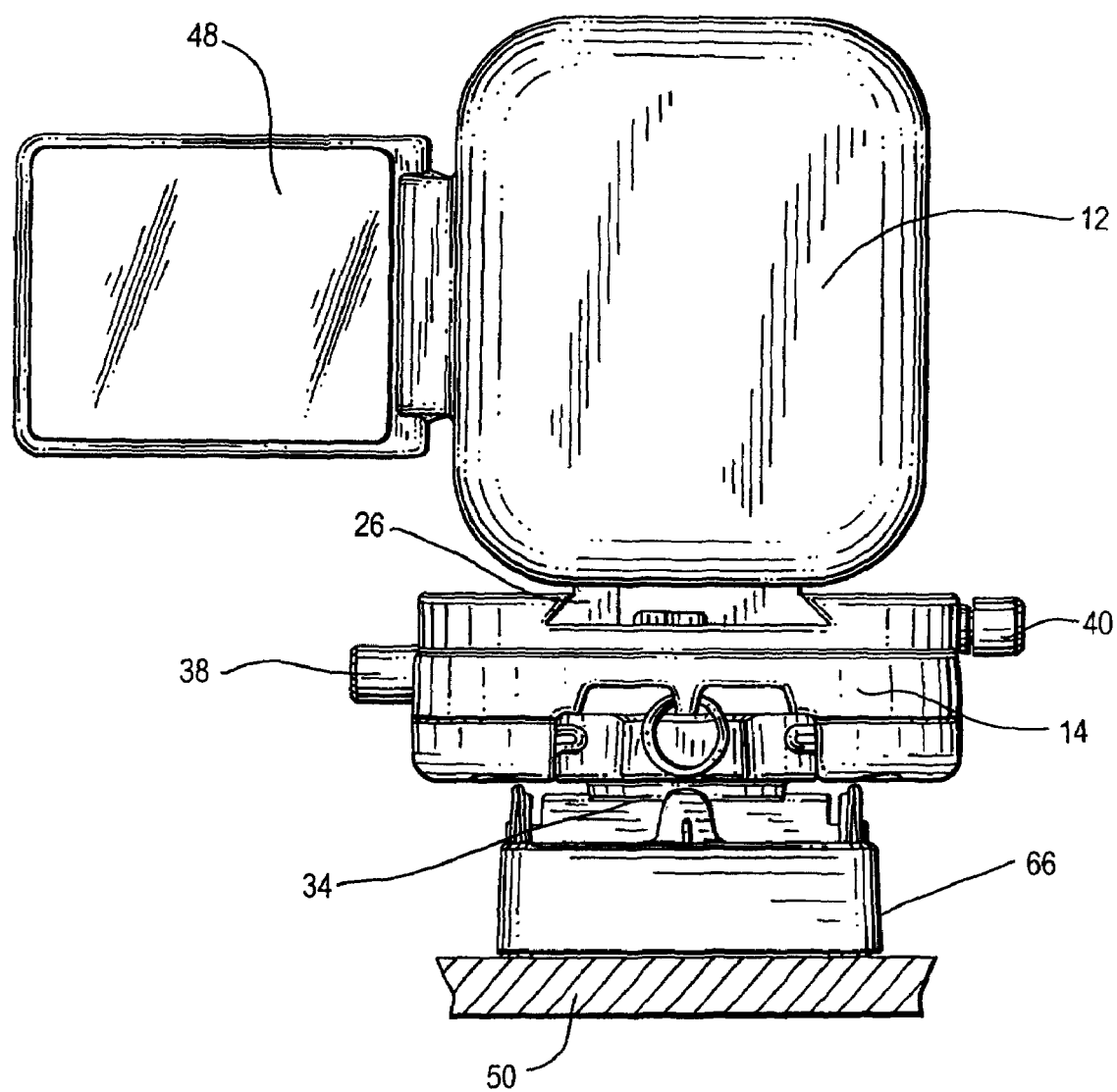
FIG. 17 is a rear elevational view of the tools of FIG. 15 in use during a subsequent balancing step, analogous to that shown in FIG. 10, of the balancing procedure in accordance with this invention.
Figure 18:
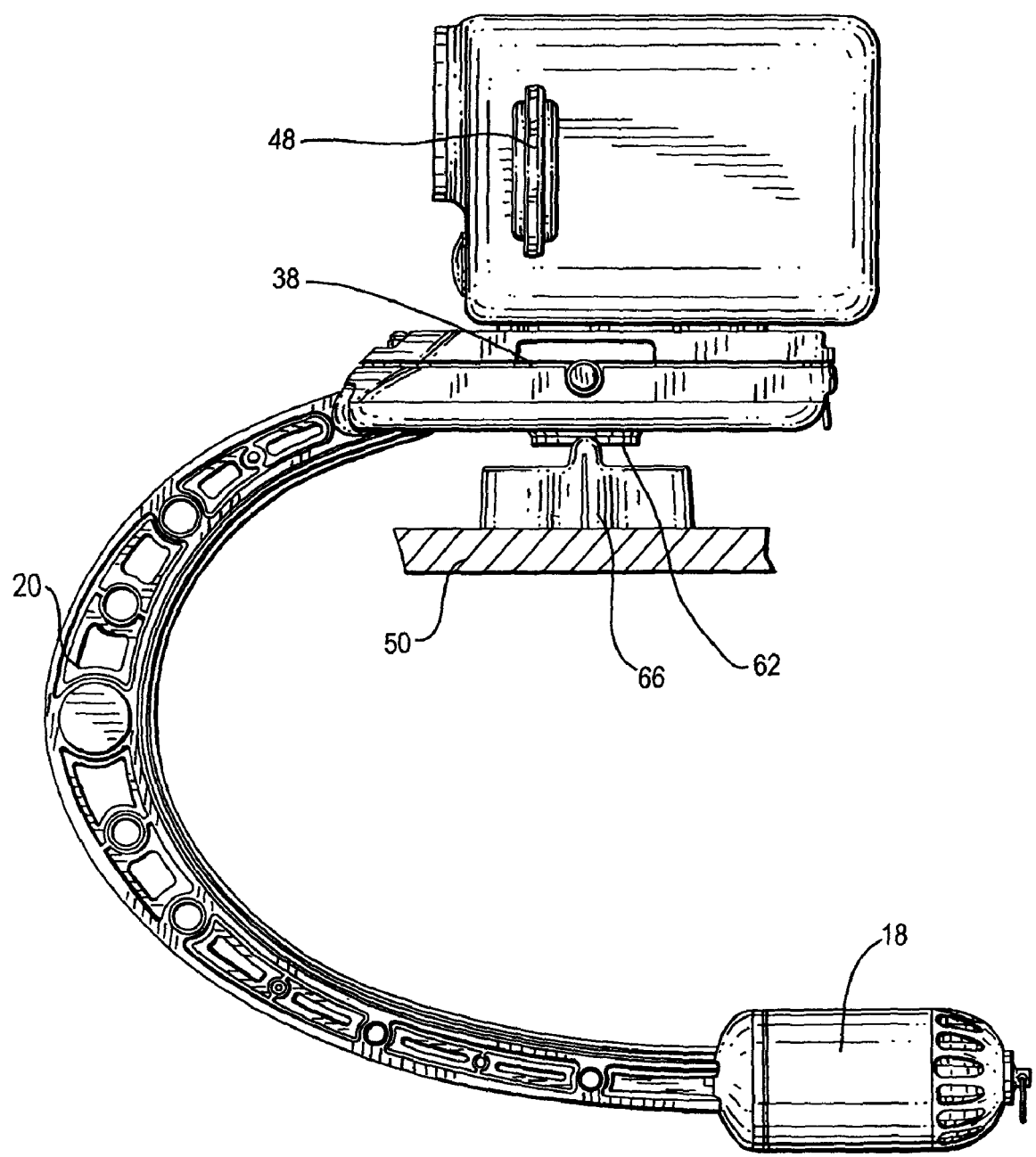
FIG. 18 is a front elevational view of the tools of FIG. 15 in use during a further subsequent balancing step, analogous to that shown in FIG. 11, of the balancing procedure in accordance with this invention.

A pair of foldable legs 46 (see FIG. 13) is optionally mounted on the arm 20 for supporting the stabilized support 10 on a support surface when the stabilized support 10 is to be used as a tripod, or not in ambulatory use. Thus, the stabilized support 10 may be supported by the handle 16 or by the legs 46. The handle 16 has a virtually friction-free, three-axis, ball bearing gimbal 60 that is indexably lockable and threaded into a threaded coupler 62 that extends along a vertical coupler axis that is aligned with the center of gravity of the equipment 12. The handle 16 can engage a mounting notch for convenient fold-up storage during transport or equipment storage, as shown in FIG. 2.

Figure 8:
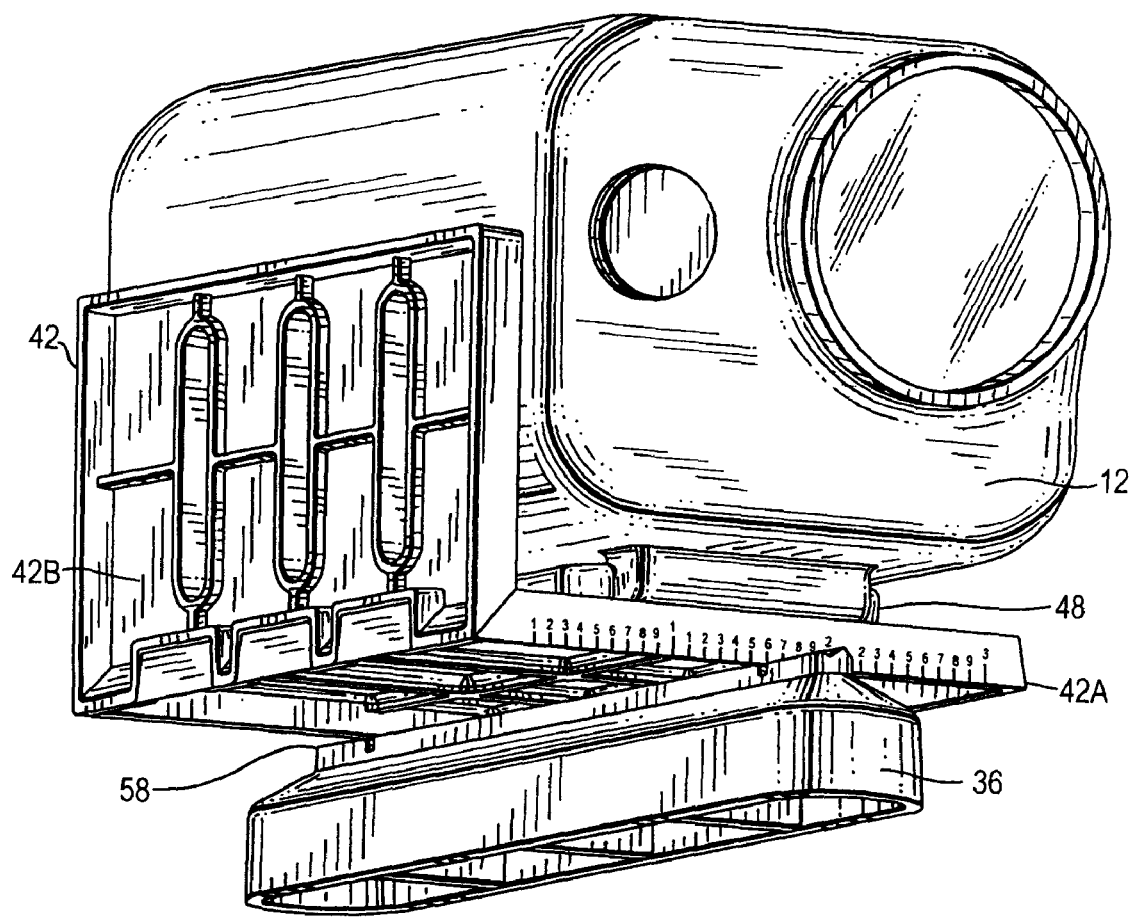
FIG. 8 is a perspective view from below of one embodiment of a squaring tool mounted on the camera equipment that, in turn, is balanced on one embodiment of a balance tool during an initial balancing step of a balancing procedure in accordance with this invention.
Figure 9:
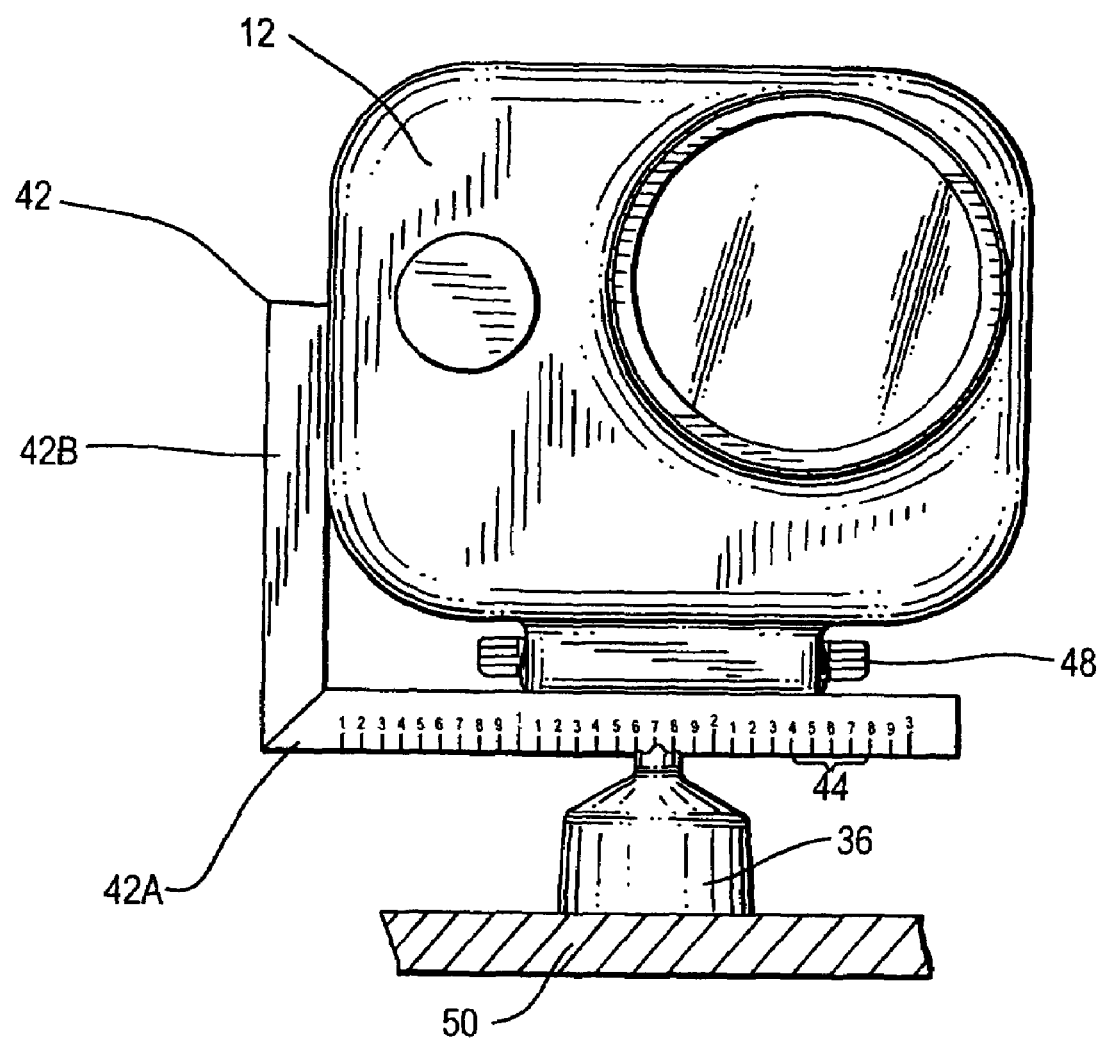
FIG. 9 is a front elevational view of the squaring tool mounted on the camera equipment that, in turn, is balanced on the balance tool during the balancing step of FIG. 8.

Still another aspect of this invention is directed to the method of balancing the motion-sensitive camera equipment 12. The method is performed by initially mounting the camera equipment 12, as shown in FIGS. 8-9, in one orientation on the squaring tool 42. This squaring tool 42 resembles a carpenter's square and has a horizontal plate 42A meeting a vertical plate 42B at a right angle. For example, the camera equipment 12 is turned 90 degrees from its normal, upright, intended position of use and is mounted with its side surface facing the horizontal plate 42A of the squaring tool 42, with its bottom surface contacting the vertical plate 42B of the squaring tool 42, and with its viewfinder 48 folded flat against the side surface and in contact with the horizontal plate 42A. Then, the squaring tool 42 and the camera equipment 12 in said one orientation is mounted for free pivoting movement, in a seesaw-like manner, about the coupler axis on the stationary balance tool 36 (shown in isolation in FIG. 12) mounted on a stationary horizontal support surface 50. Then, when the squaring tool 42 with the camera equipment 12 in said one orientation are horizontally balanced on the stationary balance tool 36, the indicia 44 on the squaring tool 42 is read. This indicia 44, together with additional information, e.g., the weight of the equipment 12, is then used to determine how many ballast weights 22 and where the ballast weights 22 are to be placed within the above-described platform 14. A chart, slide ruler, software program, online calculator, or the like is provided for correlating the indicia 44 and the equipment weight to the number and placement of the ballast weights 22.

Figure 10:
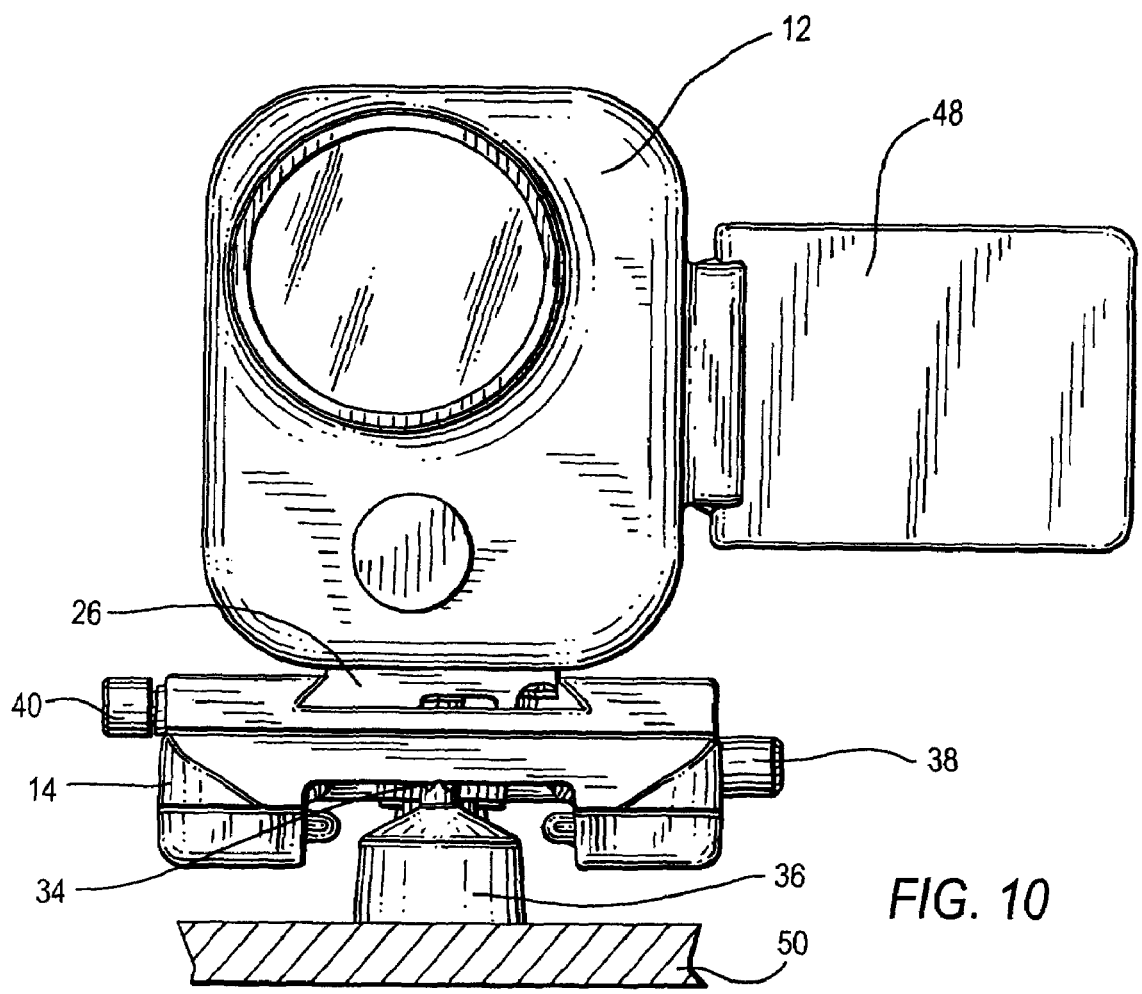
FIG. 10 is a front elevational view of the camera equipment mounted on the platform that, in turn, is balanced on the balance tool during a subsequent balancing step of the balancing procedure in accordance with this invention.

The method is further performed by removing the squaring tool 42 from the camera equipment 12, and mounting the camera equipment 12 in another orientation on the ballasted platform 14, that is, with the ballast weights 22 already positioned within the platform 14. For example, the camera equipment 12 is mounted upright in its normal position of use, as shown in FIG. 10, with its viewfinder 48 deployed, i.e., extending horizontally away from a side surface of the upright camera equipment 12, and with its bottom surface, together with the mounting plate 26, contacting the platform 14. Then, the ballasted platform 14 with the camera equipment 12 in said other orientation is mounted for free pivoting movement, in a seesaw-like manner, about the coupler axis on the stationary balance tool 36, again mounted on the stationary horizontal support surface 50. Then, the ballasted platform 14 with the camera equipment 12 in said other orientation is adjusted by turning the adjusting element 38 until the assembly assumes a horizontally balanced position. Thus, the camera equipment 12 in its normal position of use on the ballasted platform 14 is horizontally balanced, i.e., from side-to-side.

Figure 11:
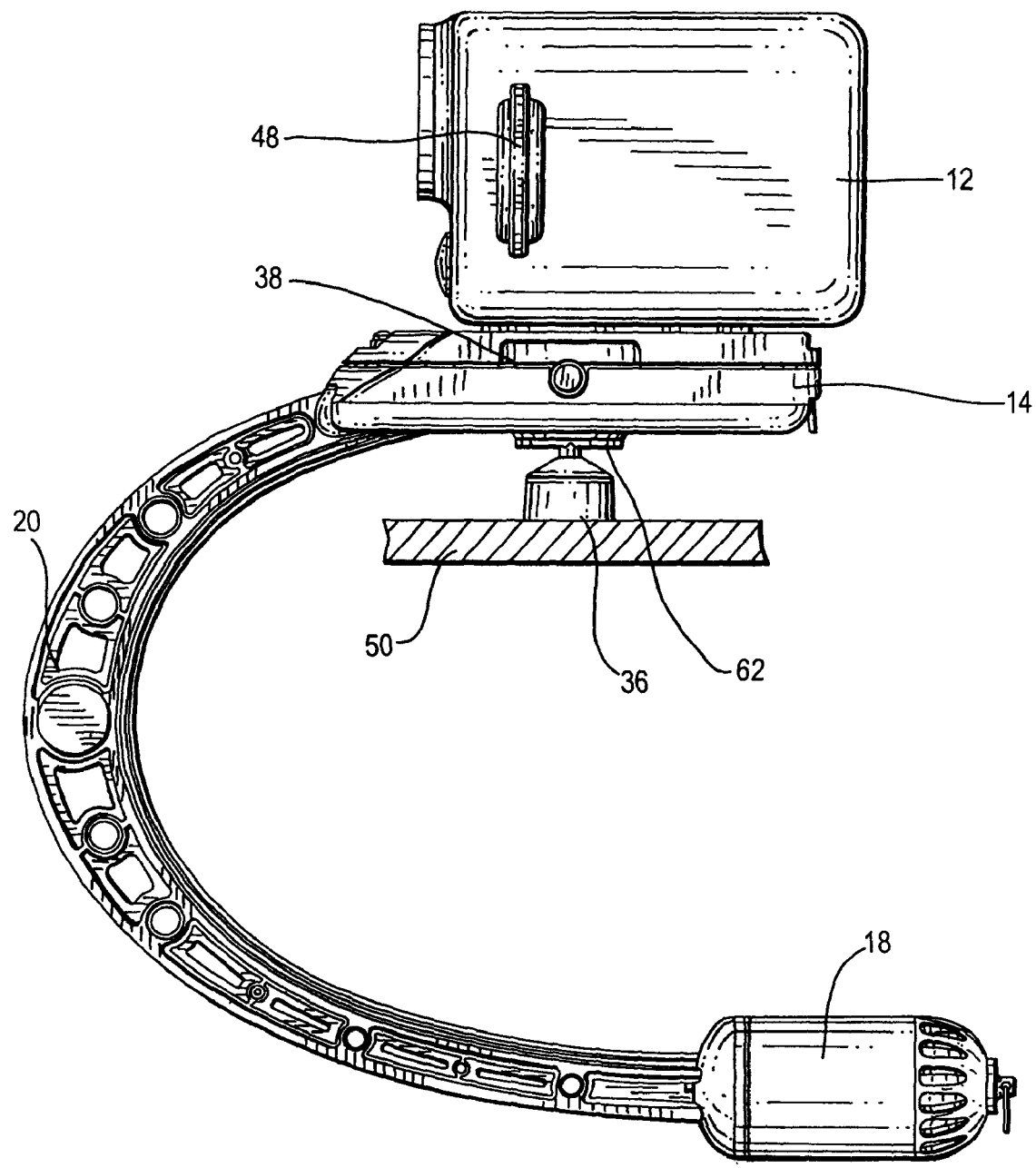
FIG. 11 is a side elevational view of the stabilized support of FIG. 1, balanced on the balance tool during a further subsequent balancing step of the balancing procedure in accordance with this invention.

The method is still further performed by mounting the ballasted platform 14, as shown in FIG. 11, with the camera equipment 12 in said other orientation on the above-described support structure having the counterweight 18 mounted below the ballasted platform 14, by mounting the support structure and the ballasted platform 14 with the camera equipment 12 in said other orientation for free pivoting movement, in a seesaw-like manner, about the coupler axis on the stationary balance tool 36, and by sliding the camera equipment 12 and the mounting plate 26 fore and aft in a coarse adjustment, and by adjusting the counterweight 18 fore or aft in a fine adjustment, e.g., by turning its knurled end piece, until the support structure and the ballasted platform 14 with the camera equipment 12 in said other orientation is horizontally balanced on the stationary balance tool 36, again mounted on the stationary horizontal support surface 50.

Figure 12:
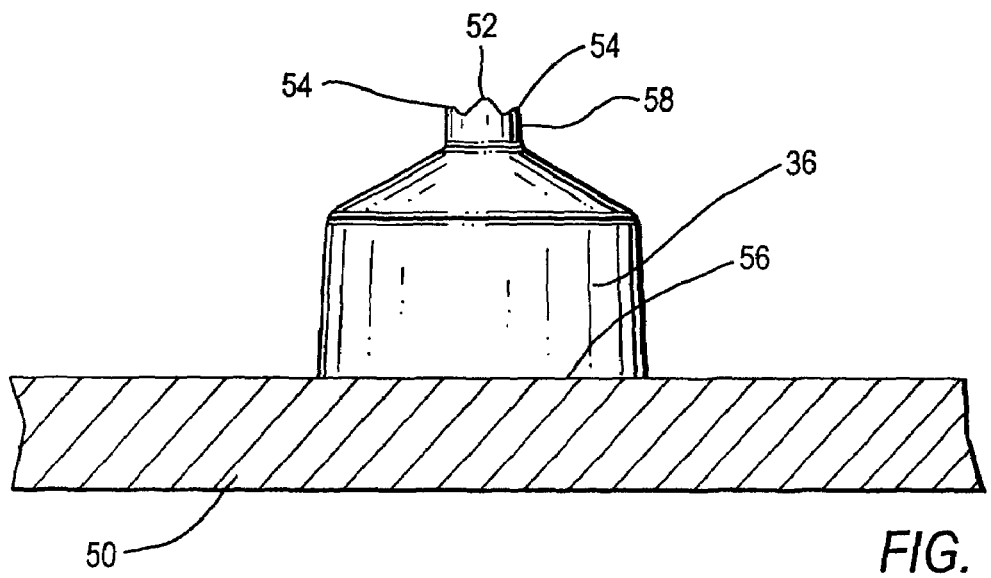
FIG. 12 is a front elevational enlarged view of the embodiment of the balancing tool of FIG. 8 in isolation.

FIG. 12 shows the stationary balance tool 36 having a flat bottom surface 56 resting on the stationary horizontal support surface 50, and an upright post 58 terminating in a fulcrum 52 and a pair of generally flattened ridges 54 on opposite sides of the fulcrum 52. As best seen in FIG. 8, the post 58 is elongated and extends past the camera equipment 12. The fulcrum 52 serves as the pivot point for the squaring tool 42 (FIG. 9), for the platform 14 (FIG. 10), and for the stabilized equipment support 10 (FIG. 11), and balance is achieved whenever the structure on the fulcrum 52 is horizontally level. The fulcrum 52 also serves as a pointer to point to one of the indicia 44 on the squaring tool 42 (FIG. 9) in the balanced position. The ridges 54 serve to prevent the various components mounted thereon from falling off the post 58.

FIGS. 14-18 depict preferred embodiments of the squaring and balance tools. The squaring tool 64 likewise has a horizontal plate 64A meeting a vertical plate 64B at a right angle. The stationary balance tool 66 has a pair of spaced-apart upright rounded posts 68 that are received in a corresponding pair of spaced-apart bottom channels 72 on the underside of the horizontal plate 64A, and a ridge 70 serving as a fulcrum spans the posts 68. A ruler 74 bearing the indicia 44 extends from the vertical plate 64B to and past the fulcrum 70. The operation of the squaring and balance tools 64, 66 is as described above for the squaring and balance tools 42, 36. Thus, FIGS. 16-18 correspond to the above-described FIGS. 9-11.

The following chart (Table 1) gives representative correlation data used in the balancing procedure.

TABLE 1

| Equipment Weight (oz.) | Indicia Reading (inches) | Number of bottom counterweights | Number of top ballast weights | Number of handle turns |
|---|---|---|---|---|
| 8 | 1 | 0 | 28 | 3 |
| 8 | 3 | 1 | 27 | 4 |
| 9 | 2 | 0 | 28 | 3 |
| 9 | 3 | 1 | 27 | 4 |
| 9 | 4 | 1 | 25 | 4 |

Thus, by way of example, if the indicia 44 on the ruler 74 reads a value of three inches, and if the equipment 12 weight is eight ounces, then one bottom counterweight 18 and twenty-seven top ballast weights 22 will be required, and in addition, the handle 16 and the gimbal 60 are threaded into the coupler 62 by four turns. The above-described balancing is actually achieved slightly above the center of gravity of the entire support 10 such that the support 10 will have a tendency to be slightly bottom heavy and hang upright. The adjustability of the gimbal handle 16, i.e., the number of turns threaded into the coupler, compensates for the offset center of gravity.

It will be understood that each of the elements described above, or two or more together, also may find a useful application in other types of constructions differing from the types described above. For example, the equipment need not only be still or video cameras, but can equally well be video recorders, video projectors, and any device that images a target, such as electro-optical readers of bar code symbols, optical character recognition readers, scanners, etc., as well as devices that incorporate imagers, such as cellular telephones, computers, personal digital assistants, gaming consoles, telescopes, etc.

As described, the equipment 12 mounted on the ballasted platform 14 is balanced as an assembly prior to mounting on the structure 16, 18, 20. This enables a plurality of such assemblies to be readily interchanged on a single structure 16, 18, 20. The adjusting element 38 and the adjustable counterweight 18 can be used for fine tuning of the balance. The ballast weights 22 inside the platform provide for coarse tuning of the balance.

As described, the stabilized support 10 can be adapted to support many different types of equipment 12. The stabilized support 10 can also be customized to support a single piece of equipment. The stabilized support 10 and the particular piece of equipment 12 are together customized to comprise a weight-stabilized arrangement. For example, since the physical characteristics of a specific piece of equipment 12 are known in advance, a manufacture can pre-load the ballast weights 22 within the platform, and even pre-balance the stabilized support 10, thereby customizing its use just for that specific piece of equipment. The customized support can then be sold separately from, or in conjunction with, that specific piece of equipment. If desired, the platform 14 can be sealed so that the ballast weights 22 cannot be removed therefrom.

More particularly, the weight-stabilized arrangement (comprising the combination of the stabilized support 10 and a specific piece of equipment 12) is customized by taking into account the overall geometry of the stabilized support 10 as it relates to such factors including, but not limited to, the placement and mass distribution of the specific piece of equipment 12, the placement and mass distribution of front weights on the arcuate arm 20, the placement and mass distribution of a bottom counterweight 18, the placement and mass distribution of ballast weights 22 in the platform, the placement and mass distribution of the platform 14, and the placement and mass distribution of the gimbal handle 16, and, in short, the weight and mass distribution of all the elements of the stabilized support 10 and the equipment 12. In order to accommodate a specific payload, i.e., a specific piece of equipment 12, each element of the stabilized support 10 is carefully designed and placed such that its mass and location of its center of gravity will work in unison with the payload's characteristics, e.g., weight and location of center of gravity, in order to achieve a stabilized arrangement that is properly balanced at a specific point for a specific payload. These elements must also be placed such that they will not physically interfere with the operator during use, e.g., having the lower counterweight 18 hit the operator's forearm.

While the invention has been illustrated and described as embodied in a stabilized equipment support and a method of balancing the same and, more particularly, to supporting ultra-lightweight cameras or other motion-sensitive equipment to isolate such equipment from unwanted motion during use, as well as a weight-stabilized arrangement in which the support and the equipment are customized to each other, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A stabilized support for supporting motion-sensitive equipment, comprising:
   a platform on which the equipment is mounted;
   a structure on which the platform is detachably mounted, the structure including a handle for holding by an operator, a counterweight mounted below the platform, and an arm for connecting the handle with the counterweight; and
   a plurality of ballast weights mounted within the platform remotely from the structure to balance the support.

2. The stabilized support of claim 1, wherein the platform has an interior, and wherein the ballast weights are mounted in the interior of the platform.

3. The stabilized support of claim 1, wherein the platform has a plurality of interior compartments at opposite sides of the platform and arranged about a center of gravity, and wherein each ballast weight is held and confined in an individual compartment.

4. The stabilized support of claim 1, and a mounting plate fixed to the equipment, and wherein the equipment and the mounting plate are jointly and adjustably mounted on the platform, and a locking element on the platform for locking the mounting plate in position on the platform.

5. The stabilized support of claim 4, wherein the mounting plate has a pair of hinged plate portions movable relative to each other to enable access to a control on the equipment.

6. The stabilized support of claim 1, wherein the platform rests on a stationary balance tool when the platform is detached from the structure, and an adjustable element on the platform for balancing the platform relative to the stationary balance tool in a balanced position relative to a center of gravity.

7. The stabilized support of claim 1, and a squaring tool fixed to the equipment and having indicia thereon.

8. The stabilized support of claim 1, and a pair of legs mounted on the arm for supporting the stabilized support.

9. A stabilized support for supporting motion-sensitive camera equipment, comprising:
   a platform on which the camera equipment is mounted, the platform having a plurality of interior compartments at opposite sides of a center of gravity;
   a structure on which the platform is detachably mounted, the structure including a handle for holding by an operator, a counterweight mounted below the platform, and an arm for connecting the handle with the counterweight; and
   a plurality of ballast weights held and confined in the interior compartments within the platform to balance the support relative to the center of gravity.

10. The stabilized support of claim 9, wherein the ballast weights are pre-positioned within the platform to customize the stabilized support for a particular piece of the camera equipment.

11. A weight-stabilized arrangement, comprising:
    a motion-sensitive apparatus; and
    a support for supporting, and customized to, the apparatus, the support including
      a platform on which the apparatus is mounted,
      a structure on which the platform is mounted, the structure including a handle for holding by an operator, a counterweight mounted below the platform, and an arm for connecting the handle with the counterweight, and
      a ballast weight pre-positioned and mounted within the platform remotely from the structure to balance the arrangement relative to a center of gravity.

12. A method of balancing motion-sensitive camera equipment, comprising the steps of:

mounting the camera equipment in one orientation on a squaring tool having indicia;

mounting the squaring tool and the camera equipment in said one orientation for pivoting movement about a center of gravity on a stationary balance tool mounted on a stationary horizontal support surface; and reading indicia on the squaring tool when the squaring tool with the camera equipment in said one orientation is horizontally balanced on the stationary balance tool relative to the center of gravity.

13. The method of claim 12, and the steps of configuring a platform with a plurality of interior compartments, supplying a plurality of ballast weights, and selecting the ballast weights for placement in and confinement by the interior compartments within the platform based, at least in part, upon the indicia read.

14. The method of claim 13, wherein the selecting step is also based upon a weight of the camera equipment.

15. The method of claim 13, and the steps of removing the squaring tool from the camera equipment, mounting the camera equipment in another orientation on the platform, and mounting the platform with the camera equipment in said other orientation for pivoting movement about the center of gravity on the stationary balance tool, and adjusting the platform with the camera equipment in said other orientation to a horizontally balanced position relative to the center of gravity.

16. The method of claim 15, and the steps of mounting the platform with the camera equipment in said other orientation on a support structure having a counterweight mounted below the platform, mounting the support structure and the platform with the camera equipment in said other orientation for pivoting movement about the center of gravity on the stationary balance tool, and adjusting the position of the camera equipment relative to the platform until the support structure is horizontally balanced on the stationary balance tool relative to the center of gravity.

17. The method of claim 16, and the step of adjusting the counterweight relative to the center of gravity.

18. A stabilized support for supporting motion-sensitive camera equipment, comprising:

a platform on which the camera equipment is detachably mounted, a counterweight mounted below the platform, a curved arm extending between the platform and the counterweight, a handle connected to the platform for holding the camera equipment, the platform, the counterweight and the curved arm by an operator, at least one ballast weight supported on the platform remotely from the counterweight and the curved arm to balance the support when held by the operator, and a support leg mounted on the curved arm and pivotable to a support position in which the leg supports the platform and the camera equipment on a support surface when not held by the operator.

\* \* \* \* \*